(12) United States Patent
Elman et al.

(10) Patent No.: US 7,157,736 B2
(45) Date of Patent: Jan. 2, 2007

(54) MULTI-LAYER COMPENSATION FILM INCLUDING STRETCHABLE BARRIER LAYERS

(75) Inventors: James F. Elman, Fairport, NY (US); Jon A. Hammerschmidt, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/159,736

(22) Filed: Jun. 23, 2005

(65) Prior Publication Data

US 2005/0237457 A1    Oct. 27, 2005

Related U.S. Application Data

(63) Continuation-in-part of application No. 10/745,109, filed on Dec. 23, 2003, now Pat. No. 6,995,395.

(51) Int. Cl.
*H01L 29/04* (2006.01)
*G02F 1/1335* (2006.01)

(52) U.S. Cl. .......................... 257/59; 257/72; 349/119; 349/120

(58) Field of Classification Search ................ 257/59, 257/72; 438/30; 428/412, 1.3–1.33; 349/119, 349/120
See application file for complete search history.

(56) References Cited

U.S. PATENT DOCUMENTS

| | | | |
|---|---|---|---|
| 2,336,310 A | 12/1943 | Spence et al. | |
| 2,367,603 A | 1/1945 | Nystrom | |
| 2,492,078 A | 12/1949 | Welch | |
| 2,492,977 A | 1/1950 | Fordyce et al. | |
| 2,492,978 A | 1/1950 | Fordyce et al. | |
| 2,607,704 A | 8/1952 | Fordyce et al. | |
| 2,681,294 A | 6/1954 | Beguin | |
| 2,739,069 A | 3/1956 | Fordyce et al. | |
| 2,739,070 A | 3/1956 | Fordyce et al. | |
| 2,761,417 A | 9/1956 | Russell et al. | |
| 2,761,791 A | 9/1956 | Russell | |
| 4,001,024 A | 1/1977 | Dittman et al. | |
| 4,569,863 A | 2/1986 | Koepke et al. | |
| 5,340,613 A | 8/1994 | Hanzalik et al. | |
| 5,405,740 A | 4/1995 | LaBelle | |
| 5,415,993 A | 5/1995 | Hanzalik et al. | |
| 5,525,376 A | 6/1996 | Leonard | |
| 5,733,608 A | 3/1998 | Kessel et al. | |
| 5,750,641 A * | 5/1998 | Ezzell et al. | 528/353 |

(Continued)

FOREIGN PATENT DOCUMENTS

EP    544 013 A1    6/1993

(Continued)

*Primary Examiner*—Long Tran
(74) *Attorney, Agent, or Firm*—Sarah Meeks Roberts (57) ABSTRACT

A multilayer compensator has two or more first layers and one or more second layers. The overall in-plane retardation of the compensator is from 0 to 300 nm and the out-of-plane retardation is more negative than −20 nm or more positive than +20 nm. The compensator may be fabricated by: coating at least one barrier layer on at least one first layer; coating at least one second layer from an organic coating solvent on the barrier layer to produce an intermediate compensator structure; and stretching the intermediate compensator structure in at least one direction by between 1% and 60%. The barrier layer contains a polymer that is water soluble or water dispersible in an amount sufficient to impede the diffusion of the organic solvent between the other first layers and the second layers. All layers have been stretched simultaneously.

36 Claims, 2 Drawing Sheets

U.S. PATENT DOCUMENTS

| | | | |
|---|---|---|---|
| 5,843,530 A | 12/1998 | Jerry et al. | |
| 5,849,363 A | 12/1998 | Yapel et al. | |
| 6,476,415 B1 * | 11/2002 | Walker et al. | 257/59 |
| 2003/0219549 A1 | 11/2003 | Shimizu | |
| 2004/0021814 A1 * | 2/2004 | Elman et al. | 349/117 |
| 2004/0027520 A1 * | 2/2004 | Elman et al. | 349/117 |
| 2005/0024561 A1 * | 2/2005 | Elman et al. | 349/117 |
| 2005/0030456 A1 | 2/2005 | Murakami et al. | |
| 2005/0058781 A1 | 3/2005 | Hayashi et al. | |

FOREIGN PATENT DOCUMENTS

| | | |
|---|---|---|
| EP | 0 911 656 A2 | 4/1999 |
| GB | 640731 | 7/1950 |
| GB | 736892 | 9/1955 |
| JP | 454554 | 2/1970 |
| JP | 49005614 | 1/1974 |
| JP | 60176834 | 9/1985 |
| JP | 60203430 | 10/1985 |
| JP | 62115035 | 5/1987 |
| JP | 3199201 | 8/1991 |
| JP | 5194789 | 8/1993 |
| JP | 5197073 | 8/1993 |
| JP | 5271471 | 10/1993 |
| JP | 6107854 | 4/1994 |
| JP | 2000275434 | 10/2000 |
| JP | 2003315541 | 11/2003 |
| JP | 2003344657 | 12/2003 |
| JP | 2003344658 | 12/2003 |
| JP | 2003344856 | 12/2003 |
| JP | 2004004474 | 1/2004 |
| JP | 2004046097 | 2/2004 |
| WO | WO 2004-063252 A1 | 7/2004 |

* cited by examiner

MULTI-LAYER COMPENSATION FILM INCLUDING STRETCHABLE BARRIER LAYERS

CROSS REFERENCE TO RELATED APPLICATIONS

This is a continuation-in-part of U.S. non-provisional application Ser. No. 10/745,109, filed on 23 Dec. 2003 now U.S. Pat. No. 6,995,395.

FIELD OF THE INVENTION

The present invention relates to a multilayer optical compensator for liquid crystal displays. The invention also relates to a method for making such a compensator and liquid crystal displays using the compensator.

BACKGROUND OF THE INVENTION

Triacetylcellulose (TAC, also called cellulose triacetate) film has traditionally been used by the photographic industry due to its unique physical properties and flame retardance. TAC film is also the preferred polymer film for use as a cover sheet for the polarizers used in liquid crystal displays. It is the preferred material for this use because of its extremely low in-plane birefringence. Its out of plane birefringence is also small (but not zero), and is useful in providing some optical compensation to the LCD.

Intrinsic birefringence describes the fundamental orientation of a material at a molecular level. It is directly related to the molecular structure (bond angles, rotational freedom, presence of aromatic groups, etc.) of the material. The intrinsic birefringence is not affected by process conditions (temperature, stresses, pressures) used to make a macroscopic object.

Crystalline and liquid crystalline materials have the convenient property that their intrinsic birefringence manifests itself almost perfectly when they are assembled into a macroscopic article. Layers of crystalline and liquid crystalline molecules often can be manufactured such that all the molecules in the article are in registry with each other and thus preserve their fundamental orientation. The same is not true when making layers of an amorphous polymeric material. Their intrinsic birefringence can be highly modified by the manufacturing process. Thus, the measured birefringence of an actual article will be a resultant of its intrinsic birefringence and the manufacturing process. Because in some embodiments we are dealing with such amorphous polymeric materials, the following definitions refer to this measured birefringence and not intrinsic birefringence.

In-plane birefringence, $\Delta n_{in}$, means the difference between $n_x$ and $n_y$, $(n_x-n_y)$, where x and y lie in the plane of the layer, and where $n_x$ and $n_y$ are indices of refraction in the directions of x and y, respectively. Here, the x axis is taken as a direction of maximum index of refraction in the x-y plane and the y direction is perpendicular to the x axis. Accordingly, $n_x$ will be defined as always being the larger refractive index, and $n_y$ will be defined as the being the smaller refractive index and in the y direction, perpendicular to $n_x$. The sign convention used will be $n_x-n_y$ and will always be positive.

In-plane retardation, $R_{in}$, is a quantity defined by $(n_x-n_y)d$, where d is a thickness of the layer in the z-direction, perpendicular to the x-y plane. $R_{in}$ will always be a positive quantity. The values of $\Delta n_{in}$ and $R_{in}$ hereafter are given at wavelength $\lambda=590$ nm.

Out of-plane retardation $R_{th}$, of a layer is a quantity defined by $[n_z-(n_x+n_y)/2]d$, where $n_z$ is the index of refraction in z-direction. The quantity $[n_z-(n_x+n_y)/2]$ is referred to as out-of-plane birefringence, $\Delta n_{th}$. If $n_z>(n_x+n_y)/2$, $\Delta n_{th}$ is positive, thus the corresponding $R_{th}$ is also positive. If $n_x<(n_x+n_y)/2$, $\Delta n_{th}$ is negative and $R_{th}$ is also negative. The values of $\Delta n_{th}$ and $R_{th}$ hereafter are given at $\lambda=590$ nm.

Amorphous means a lack of molecular order. Thus an amorphous polymer does not show molecular order as measured by techniques such as X-ray diffraction.

Chromophore means an atom or group of atoms that serve as a unit in light adsorption. (*Modern Molecular Photochemistry* Nicholas J. Turro Editor, Benjamin/Cummings Publishing Co., Menlo Park, Calif. (1978) Pg 77). Typical chromophore groups include vinyl, carbonyl, amide, imide, ester, carbonate, aromatic (i.e. heteroaromatic or carbocylic aromatic such as phenyl, naphthyl, biphenyl, thiophene, bisphenol), sulfone, and azo or combinations of these groups.

Non-visible chromophore means a chromophore that has an absorption maximum outside the range of 400–700 nm.

Continuous means that articles are in contact with each other. In two contiguous layers, one layer is in direct contact with the other. Thus, if a polymer layer is formed on the substrate by coating, the substrate and the polymer layers are contiguous.

Synthetic polymer films (such as polycarbonate or polysulfone) are often used to enhance the minimal optical compensation that TAC provides. These synthetic polymers films are attached to the rest of the display by adhesive lamination.

Generally in the field of optical materials, the synthetic polymer film is used as an optically anisotropic film (having a high retardation value), while a TAC film is used as an optical isotropic film (having a low retardation value).

European Patent Application No. 0911656 A2 and Japanese Patent Publication 2000/275434 A both disclose a TAC film having high retardation. The TAC is used as a support for an optical compensator sheet, which comprises the TAC support and an optically anisotropic layer containing a discotic liquid crystal molecule. The TAC film achieves high retardation by three methods (including the combination of these three methods): 1) the addition of special aromatic small molecules (i.e. triphenylene) to the TAC film, 2) cooling of the TAC solution before casting the film, and 3) stretching the TAC film. The addition of special aromatic molecules is discussed as being problematic as it can lead to "bleeding" of these molecules out of the TAC film. Also in the examples of this invention very long times (over an hour) are required to dry such TAC films. Such times would not be amenable to a roll to roll process.

In addition to the TAC film, the highly anisotropic, discotic liquid crystal layer requires a special alignment technique and ultra violet radiation to crosslink this monomeric layer.

U.S. Published Patent Application 2001/0026338 A1 discloses a single TAC film with high retardation without the highly anisotropic discotic layer. This TAC film achieves high retardation by the incorporation of molecules with two or more aromatic groups into the TAC film followed by stretching of the TAC film. Without such stretching, this TAC film does not demonstrate any enhanced retardation compared to regular TAC. With this stretching both in and out of plane retardation are increased. These two orthogonal retardations cannot be independently controlled by this method.

Japanese Published Patent Application JP1999-95208 describes a liquid crystal display having an optical compensator (having high retardation) prepared by uniaxial stretching of a high polymer film. Such polymers include polyesters, polycarbonate, or polysulfone. This stretching step is essential to obtain the desired optical properties. This stretching affects both in- and out-of-plane retardation simultaneously. These two orthogonal retardations cannot be independently controlled by this method. Also, producing uniform optical compensators by this method is described as being difficult.

This application also describes a compensator where the inventor uses an exfoliated inorganic clay material in a polymeric binder coated on top of a TAC support. The exfoliated inorganic clay material in this layer is the optically active material, not the polymeric binder.

Japanese Published Application JP2001-194668 describes a compensator made by laminating polycarbonate films that have been stretched. Not only does the approach require lamination (with its associated difficulties), but it also requires two independent stretchings of two different types of polycarbonate. The lamination step also requires that the two films be in registry with each other and that their optical axes be orthogonal to each other.

U.S. Pat. Nos. 5,344,916, 5,480,964, and 5,580,950 describe compensation films for LDCs. However they do not mention the need for barrier layers to control curl and improve adhesion.

It is a problem to be solved to provide a multilayer optical compensator that is readily manufactured, that provides the required degree of in-plane and out-of-plane compensation, that has excellent adhesion between layers and is free of curl caused by application of organic solvent coating solutions.

SUMMARY OF THE INVENTION

In one aspect of the present invention, a multilayer compensator comprises at least two polymeric first layers; and one or more polymeric second layers. The first layers comprise a polymer having an out-of-plane birefringence not more negative than −0.005 and not more positive than +0.005. The second layers comprise a polymer having an out-of-plane birefringence more negative than −0.005 or more positive than +0.005. The overall magnitude of the in-plane retardation ($R_{in}$) of the multilayer compensator is greater than 0 nm and less than 300 nm and the out-of-plane retardation ($R_{th}$) of the multilayer compensator is more negative than −20 nm or more positive than +20 nm. One of the first layers is contiguous to a second layer and is between all of the other first layers and all of the second layers. At least one of the second layers is a layer coated from an organic solvent. The compensator has been stretched in at least one direction by at least 1% and not more than 60% after at least two of the first were assembled together. Beneficially, the contiguous first layer includes a polymer that is water soluble or water dispersible in an amount sufficient to limit an amount of the organic solvent that diffuses into the first layers to be less than 75 mg/ft$^2$ when the organic solvent is ethylacetate, less than 105 mg/ft$^2$ when the organic solvent is propylacetate, and less than 150 mg/ft$^2$ when the organic solvent is methylene chloride. Also beneficially, the polymer of the contiguous first layer is one selected from the group consisting of polyurethanes, polyesters, polyester ionomers, epoxide containing acrylic copolymers, polyacrylates, and polyvinyl alcohols.

In another aspect of the present invention, a multilayer compensator comprises at least two polymeric first layers; and one or more polymeric second layers. The first layers comprise a polymer having an out-of-plane birefringence not more negative than −0.005 and not more positive than +0.005. The second layers comprise a polymer having an out-of-plane birefringence more negative than −0.005 or more positive than +0.005. The overall magnitude of the in-plane retardation ($R_{in}$) of the multilayer compensator is greater than 0 nm and less than 300 nm and the out-of-plane retardation ($R_{th}$) of the multilayer compensator is more negative than −20 nm or more positive than +20 nm. One of the first layers is contiguous to a second layer and is between all of the other first layers and all of the second layers. At least one of the second layers is a layer coated from an organic solvent. The contiguous first layer contains a polymer that is water soluble or water dispersible in an amount sufficient to impede the diffusion of the organic solvent between the other first layers and the second layers. All of the layers have been stretched simultaneously.

In yet another aspect of the invention, a method for forming a compensator polymeric film comprising two or more first layers having an out-of-plane birefringence not more negative than −0.005 and not more positive than +0.005, and one or more second layers having an out-of-plane birefringence more negative than −0.005 or more positive than +0.005, wherein the second layers comprise selected polymeric materials having sufficient thickness so that the overall in-plane retardation ($R_{in}$) of the compensator is from 0 to 300 nm and the out-of-plane retardation ($R_{th}$) of the compensator is more negative than −20 nm or more positive than +20 nm, comprises: (a) coating at least one barrier layer on at least one first layer; (b) coating at least one second layer from an organic coating solvent on the barrier layer to produce an intermediate compensator structure; and (c) stretching the intermediate compensator structure in at least one direction by at least 1% and not more than 60%. Beneficially, the barrier layer contains a polymer that is applied from water and is present in an amount sufficient to limit an amount of the organic solvent that diffuses into the first layers to be less than 75 mg/ft$^2$ when the organic solvent is ethylacetate, less than 105 mg/ft$^2$ when the organic solvent is propylacetate, and less than 150 mg/ft$^2$ when the organic solvent is methylene chloride. Also beneficially, the polymer of the contiguous first layer is one selected from the group consisting of polyurethanes, polyesters, polyester ionomers, epoxide containing acrylic copolymers, polyacrylates, and polyvinyl alcohols.

DETAILED DESCRIPTION OF THE INVENTION

Commonly assigned U.S. patent applications: Ser. No. 10/745,109, entitled "MULTILAYER OPTICAL COMPENSATOR, LIQUID CRYSTAL DISPLAY, AND PROCESS" and filed on 23 Dec. 2003 ("the '109 application");

Ser. No. 11/165,090, entitled "MULTI-LAYERED COMPENSATION FILM USING SPECIFIED Tg MATERIAL AS A BIREFRINGENT LAYER" and filed on the same date as the present application; and Ser. No. 11/165,683, entitled "MULTILAYER OPTICAL COMPENSATOR, LIQUID CRYSTAL DISPLAY AND PROCESS" and filed on the same date as the present application are all incorporated herein by reference in their entireties as if fully set forth herein.

In the '109 application, a multilayer optical compensator is disclosed having at least one embodiment that is characterized by two or more first layers having an out-of-plane birefringence not more negative than −0.005, and one or more second layers having an out-of-plane birefringence more negative than −0.005, wherein the second layers are amorphous and comprise selected polymeric materials having sufficient thickness so that the overall in-plane retardation ($R_{in}$) of the compensator is from 0 to 300 nm and the out-of-plane retardation ($R_{th}$) of at least one of the one or more second layers is more negative than −20 nm wherein: (a) a first layer is present that is contiguous to a second layer and is between all of the second layers and all of the other first layers; (b) at least one of the second layers or one of the other first layers is a layer coated from an organic solvent; and (c) the contiguous first layer contains a polymer that is water soluble or water dispersible in an amount sufficient to impede the diffusion of the organic solvent between the other first layers and the second layers.

In various liquid crystal displays, it is desirable to modify the birefringence of polarizer stack layers, to optimize the viewing angle for the complete screen system. The manufacturing methods of embodiments disclosed herein, in combination with specific polymers, allow a basic sheet comprising one or more first polymeric layer, to be coated (or co-cast) with one or more second polymeric layers. The thickness of the first and the second layer polymers can be varied to provide a "tunable" package of optical properties. In dry-stretching, stresses applied to the sheet after manufacturing can control the in-plane (x,y) retardation and the thickness of the second layer polymer can control the out-of-plane retardation. This can result in a simple way to create a useful sheet in a cost effective manner.

It has been found by the inventors that stretching ("active tentering") of an already dried multilayer optical compensator can produce desirable amounts of in-plane anisotropy. In particular, by stretching an already dried multilayer optical compensator it is possible produce in-plane retardation values of up to 300 nm. Stretching can occur in a transverse direction, i.e., in a direction coincident with a casting direction of the film. Alternately, or in addition, stretching can occur in a direction perpendicular the transverse direction. Also alternately, or in addition, stretching can occur obliquely relative to the transverse direction (i.e. in a diagonal fashion).

It has also been found by the inventors that providing a barrier layer between the first layer(s) and the second layer(s) can prevent degradation to the optical properties of the first layer(s) that may occur during the process of coating the second layer(s) thereon, while at the same time improving adhesion between the first and second layers. In particular, when the second layer is coated from an organic solvent, the provision of a barrier layer can prevent a substantial amount of organic solvent(s) from permeating into the first layer(s). If allowed to permeate into the first layer(s), these organic solvents can degrade the optical characteristics of the multilayer optical compensator during subsequent process steps, such as heating the multilayer optical compensator during a stretching process.

Accordingly, disclosed herein are a class of multilayer optical compensators at least partially characterized by the provision of a barrier layer that contains a polymer that is water soluble or water dispersible in an amount sufficient to impede the diffusion of the organic solvent between the other first layers and the second layers. Also beneficially, the barrier layer comprises a stretchable material such that the multilayer optical compensator can be stretched in at least one direction by at least 1% and not more than 60% after at least two of the first layers were assembled together.

Beneficially, in the case where the out-of-plane retardation ($R_{th}$) of the multilayer compensator is more negative than −20 nm, at least one second layer includes a polymer containing in the backbone a non-visible chromophore group and has a $T_g$ above 110° C. The non-visible chromophore group may include a vinyl, carbonyl, amide, imide, ester, carbonate, aromatic, sulfone, or azo, phenyl, naphthyl, biphenyl, bisphenol, or thiophene group. Where the out-of-plane retardation of the multilayer compensator is more negative than −20 nm, the second layer may include a copolymer containing one or more of the following: (1) a poly(4,4'-hexafluoroisopropylidene-bisphenol) terephthalate-co-isophthalate, (2) a poly(4,4'-hexahydro-4,7-methanoindan-5-ylidene bisphenol) terephthalate, (3) a poly(4,4'-isopropylidene-2,2'6,6'-tetrachlorobisphenol) terephthalate-co-isophthalate, (4) a poly(4,4'-hexafluoroisopropylidene)-bisphenol-co-(2-norbornylidene)-bisphenol terephthalate, (5) a poly(4,4'-hexahydro-4,7-methanoindan-5-ylidene)-bisphenol-co-(4,4'-isopropylidene-2,2',6,6'-tetrabromo)-bisphenol terephthalate, (6) a poly(4,4'-isopropylidene-bisphenol-co-4,4'-(2-norbornylidene)bisphenol) terephthalate-co-isophthalate, (7) a poly(4,4'-hexafluoroisopropylidene-bisphenol-co-4,4'-(2-norbornylidene)bisphenol) terephthalate-co-isophthalate, or (8) copolymers of any two or more of the foregoing As an example of an undesirable approach for these compensators having an $R_{th}$ more negative than −20 nm, one would incorporate the fluorine group into the second layer polymer. This would introduce a non-visible chromophore group(s) off of the backbone, which would "fight" the desired non-visible chromophore group(s) in the backbone. While the fluorine group can enhance polymer solubility, one pays a high price in diminished out-of-plane birefringence with this approach (balancing non-visible chromophore group(s) both in and off of the backbone).

In the case where the out-of-plane retardation of the multilayer compensator is more positive than +20 nm, at least one second layer includes a polymer which contains off the backbone a non-visible chromophore group and has a glass transition temperature (Tg) above 110° C. The non-visible chromophore group may include a carbonyl, amide, imide, ester, carbonate, phenyl, naphthyl, biphenyl, bisphenol, or thiophene group, or a heterocyclic or carbocyclic aromatic group. The polymer may contain off the backbone a vinyl, carbonyl, amide, imide, ester, carbonate, aromatic, sulfone, or azo group. Where the out-of-plane retardation of the multilayer compensator is more positive than +20 nm, the second layer(s) may include one or more of the following polymers: (A) poly(4 vinylphenol), (B) poly(4 vinylbiphenyl), (C) poly(N-vinylcarbazole), (D) poly(methylcarboxyphenylmethacrylamide), (E) poly[(1-acetylindazol-3-yl-carbonyloxy)ethylene], (F) poly(phthalimidoethylene), (G) poly(4-(1-hydroxy-1-methylpropyl)styrene), (H) poly(2-hydroxymethylstyrene), (I) poly(2-dimethylaminocarbonyl-styrene), (J) poly(2-phenylaminocarbonylstyrene), (K) poly (3-(4-biphenylyl)styrene), (L) poly(4-(4-biphenylyl) styrene), (M) poly(4-cyanophenyl methacrylate), (N) poly (2,6-dichlorostyrene), (O) poly(perfluorostyrene), (P) poly (2,4-diisopropylstyrene), (O) poly(2,5-diisopropylstyrene), and (R) poly(2,4,6-trimethylstyrene), and (S) copolymers of any two or more of the foregoing First layer materials are desirably suitable to be solvent cast or coated such as TAC, other cellulose esters, polycarbonate, and cyclic polyolefins.

The manufacture of TAC films is well known, including the following process. A TAC solution (dope) can be prepared according to the following conventional method. In the conventional method, the procedures are conducted at a temperature of not less than 0° C. (room temperature or high temperature). The solution can be prepared by a known dope preparation process with an apparatus used in a normal solvent casting method. As the solvent, a halogenated hydrocarbon (particularly, methylene chloride) is typically used in this method. The amount of TAC is so adjusted that the content of cellulose acetate in a prepared solution is in the range of 10 to 40 wt. %, and typically in the range of 10 to 30 wt. %. Additives (described below) can be added to the organic (main) solvent.

The dope is cast on a drum or a band, and the solvent is evaporated to form a film. Before casting the dope, the concentration of the dope is typically so adjusted that the solid content of the dope is in the range of 18 to 35 wt. %. The surface of the drum or band is typically polished to give a mirror plane. The casting and drying stages of the solvent cast methods are described in U.S. Pat. Nos. 2,336,310, 2,367,603, 2,492,078, 2,492,977, 2,492,978, 2,607,704, 2,739,069, 2,739,070, British Patent Nos. 640,731, 736,892, Japanese Patent Publication Nos. 45(1970)-4554, 49(1974)-5614, Japanese Patent Provisional Publication Nos. 60(1985)-176834, 60(1985)-203430 and 62(1987)-115035.

A plasticizer can be added to the cellulose acetate film to improve the mechanical strength of the film. The plasticizer has another function of shortening the time for the drying process. Phosphoric esters and carboxylic esters (such as phthalic esters and citric esters) are usually used as the plasticizer. Examples of the phosphoric esters include triphenyl phosphate (TPP) and tricresyl phosphate (TCP). Examples of the phthalic esters include dimethyl phthalate (DMP), diethyl phthalate (DEP), dibutyl phthalate (DBP), dioctyl phthalate (DOP), diphenyl phthalate (DPP) and diethylhexyl phthalate (DEHP). Examples of the citric esters include o-acetyltriethyl citrate (OACTE) and o-acetyltributyl citrate (OACTB).

Examples of the other carboxylic esters include butyl oleate, methylacetylricinoleate, dibutyl sebacate and various trimellitic esters. The plasticizers of phthalic esters (DMP, DEP, DBP, DOP, DPP, DEHP) are preferred, and DEP and DPP are particularly preferred. The amount of the plasticizer is in the range of typically 0.1 to 25 wt. %, conveniently 1 to 20 wt. %, and desirably 3 to 15 wt. % based on the amount of cellulose acetate.

Stabilizers (e.g., oxidation inhibitor, peroxide decomposer, radical inhibitor, metal inactivating agent, oxygen scavenger, amine) can be also incorporated into the cellulose acetate film. The stabilizers are described in Japanese Patent Provisional Publication Nos. 3(1991)-199201, 5(1993)-1907073, 5(1993)-194789, 5(1993)-271471 and 6(1994)-107854. The amount of the deterioration inhibitor is in the range of 0.01 to 1 wt. %, and typically 0.01 to 0.2 wt. % based on the amount of the solution (dope). If the amount is less than 0.01 wt. %, the deterioration inhibitor hardly gives the effect. On the other hand, if the amount is more than 1 wt. %, the deterioration inhibitor often bleeds out onto the film surface. Examples of particularly preferred deterioration inhibitors include butyrated hydroxytoluene (BHT) and tribenzylamine (TBA).

Organic solvents are liquids other than water. Typically these would include aromatic or alkyl hydrocarbons, alcohols, esters, ketones, aldehydes, and halogenated analogues of the preceding list. Conveniently these would include methylacetate, ethylacetate, propylacetate, butylacetate, acetone, methylethylketone, toluene, xylene, cycopentanone, cyclohexanone, and methylene chloride. Mixtures of the above organic solvents may also prove useful. Such organic solvents may remain in the layers of the compensator. The amount retained in the compensator would depend on such factors as vapor pressure of the solvent, appropriate diffusion constants, layer thickness, temperature, and duration of drying. These residual amounts of such organic solvents could be detected by techniques such as head-space gas chromatography at a minimum detection level of about 5 mg/ft$^2$.

The thickness of the TAC film is less than 140 μm, typically in the range of 70 to 115 μm, and desirably from 40 to 100 μm.

In the case that the cellulose acetate film is used as a transparent protective film of a polarizing plate, the film surface is typically subjected to a surface treatment. Examples of the surface treatments include a corona discharge treatment, a glow discharge treatment, a flame treatment, an acid treatment, an alkali treatment and an ultraviolet ray irradiating treatment. The acid treatment or the alkali treatment is preferred. The acid treatment or the alkali treatment can function as a saponification treatment to the cellulose acetate film.

The alkali treatment is particularly preferred. The alkali treatment uses an aqueous alkali solution. The alkali typically is hydroxide of an alkali metal, such as sodium hydroxide or potassium hydroxide. The aqueous alkali solution has a pH value of typically higher than 10. At least one surface of the cellulose acetate film is immersed in the aqueous alkali solution typically for 1 to 300 seconds, and desirably for 5 to 240 seconds. The alkali treatment is conducted typically at 25 to 70° C., and desirably at 35 to 60° C. After the alkali treatment, the cellulose acetate film is typically washed with water.

First layer films as made by the above process will typically have in plane retardation ($R_{in}$) values of 0 to 5 nm. To generate greater amounts of $R_{in}$ (>5 nm) in the first layer, any viable methods can be used, however, the most commonly practiced approach is stretching. When a polymer is stretched, individual polymer chain segments are oriented predominantly to the direction of primary stretch, thus increase the in plane birefringence of the polymer layer. This is typically done above the glass transition temperature (Tg) of the polymer. Thus, the polymeric film is heated above Tg and stretched. As noted in the background section, certain small molecules can be added to a stretched film to enhance $R_{in}$. The first film can be stretched uniaxially or biaxially. In uniaxial stretching, the film is stretched in one direction. In biaxial stretching, the two stretching directions are typically perpendicular to each other. The first layer has out of plane birefringence not more negative than −0.005 and not more positive that +0.005, and the first layer of the multilayer compensator is such that the overall in-plane retardation ($R_{in}$) of the multilayer compensator can be between 0 and 300 nm.

In the embodiments disclosed herein, a first layer that is contiguous to a second layer and that is between all second layers and all of the other first layers, is a barrier layer that inhibits the diffusion of organic solvents between the second layer(s) and the other first layer(s). The barrier layer will typically be applied to a first layer such as a TAC film as described hereinabove.

In order to optimize both barrier properties and adhesion to contiguous layers, the barrier layer typically will contain two or more polymers. For example, the barrier layer may contain a water-soluble polymer such as polyvinyl alcohol and a water dispersible polymer such as a polyesterionomer.

Alternatively, the barrier layer may contain two different water dispersible polymers such as a polyesterionomer and a polyurethane.

The barrier layer may be crosslinked using known methods such as the addition of crosslinking agents, such at isocyanates, aldehydes, vinyl sulfone materials, aziridines and melamine resins or by exposure of the dried layer to actinic radiation.

The barrier layer is generally applied at dried coating weights between 10 and 6000 mg/ft$^2$, more typically between 50 and 1000 mg/ft$^2$. Barrier layer dried coating weights less than 10 mg/ft$^2$ are insufficient to prevent the diffusion of organic solvents from subsequent layers from penetrating other first layers such as TAC film.

Addenda such as surfactants or rheology modifiers may be added to the barrier layer to improve coating quality, adhesion and other properties of the layer.

The second layer(s) can be coated from a solution containing a polymer that yields high positive or negative out of plane birefringence upon solvent coating. To produce negative out-of-plane birefringence (negative out of plane retardation), polymers that contain non-visible chromophore groups such as vinyl, carbonyl, amide, imide, ester, carbonate, sulfone, azo, and aromatic groups (i.e. benzene, naphthalate, biphenyl, bisphenol A) in the polymer backbone will be used, such as polyesters, polycarbonates, polyimides, polyetherimides, and polythiophenes. To produce positive out-of-plane birefringence (negative out of plane retardation), polymers that contain off the backbone a vinyl, carbonyl, amide, imide, ester, carbonate, aromatic, sulfone, or azo group, will be used, such as a carbonyl, amide, imide, ester, carbonate, phenyl, naphthyl, biphenyl, bisphenol, or thiophene group, a heterocyclic or carbocyclic aromatic group. One could also add fillers and non-polymeric molecules to this second layer.

Other suitable second layer materials include polyimides such as:

poly(ether ketones) and poly(ether ether ketones) such as:

The polymers used in the second layer could be synthesized by a variety of techniques: condensation, addition, anionic, cationic or other common methods of synthesis could be employed.

The thickness of this second layer should be less than 30 μm. Typically it should be from 0.1 μm to 20 μm. Conveniently it should be from 1.0 μm to 10 μm. Desirably it should be from 2 μm to 8 μm.

The formulations for the barrier layer and second layer(s) described herein can be coated by various coating procedures including wire wound rod coating, dip coating, air knife coating, curtain coating, slide coating, or extrusion coating using hoppers of the type described in U.S. Pat. No. 2,681,294 (Beguin). Layers can be coated one at a time, or two or more layers can be coated simultaneously by the procedures described in U.S. Pat. No. 2,761,417 and U.S. Pat. No. 2,761,791 (Russell), U.S. Pat. No. 4,001,024 (Dittman et al.), U.S. Pat. No. 4,569,863 (Keopke et al.), U.S. Pat. No. 5,340,613 (Hanzalik et al.), U.S. Pat. No. 5,405,740 (LaBelle), U.S. Pat. No. 5,415,993 (Hanzalik et al.), U.S. Pat. No. 5,525,376 (Leonard), U.S. Pat. No. 5,733,608 (Kessel et al.), U.S. Pat. No. 5,849,363 (Yapel et al.), U.S. Pat. No. 5,843,530 (Jerry et al.). The coated layers can be dried in forced air at a temperature of from about 20° C. to about 115° C.

The combined thickness of the multilayer compensator should be less than 180 μm. Typically it should be from 41 μm to 105 μm. Desirably it should be from 41 μm to 90 μm.

The second layer should be of sufficient thickness so that the out-of-plane retardation of the multilayer compensator is more negative than −20 nm or more positive than +20 nm. Beneficially, it should be from −600 nm to −40 nm, or from +600 nm to +40 nm. More beneficially, it should be from −500 nm to −60 nm, or from +500 nm to +60 nm. Desirably it should be from −400 nm to −80 nm, or from +400 nm to +80 nm.

Also disclosed is a method for forming a compensator polymeric film.

Various aspects of the embodiments disclosed herein can be seen in greater detail by referring to the drawings as follows.

Figure 1:
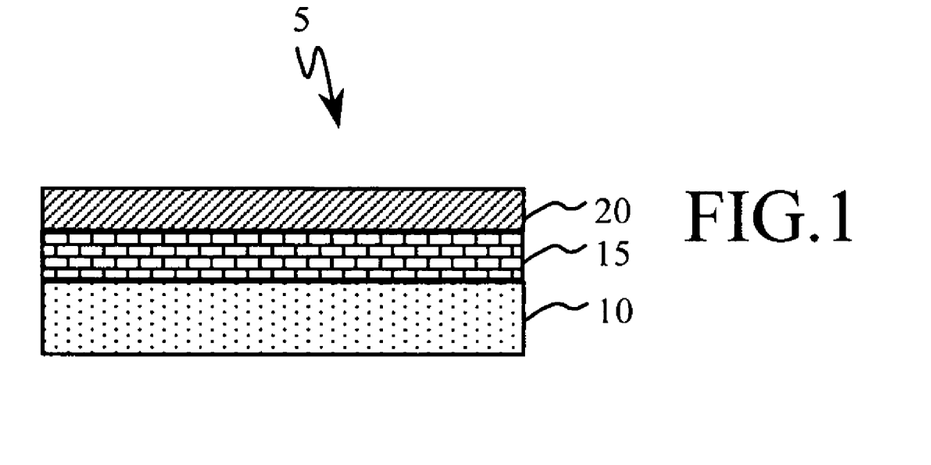
FIG. 1 is a cross-sectional view of a multi-layer compensator having 3 layers.

FIG. 1 shows a cross-sectional schematic of a multilayer compensator 5. The compensator includes a polymeric first layer 10, a contiguous first layer 15 that also serves as a barrier layer, and a polymeric second layer 20 that is contiguous to the barrier layer 15, and the combined in-plane retardation ($R_{in}$) of layers 10, 15 and 20 is from 0 to 300 nm and the out-of-plane retardation ($R_{th}$) of multilayer compensator 5 is more negative than −20 nm or more positive than +20 nm.

Figure 2:
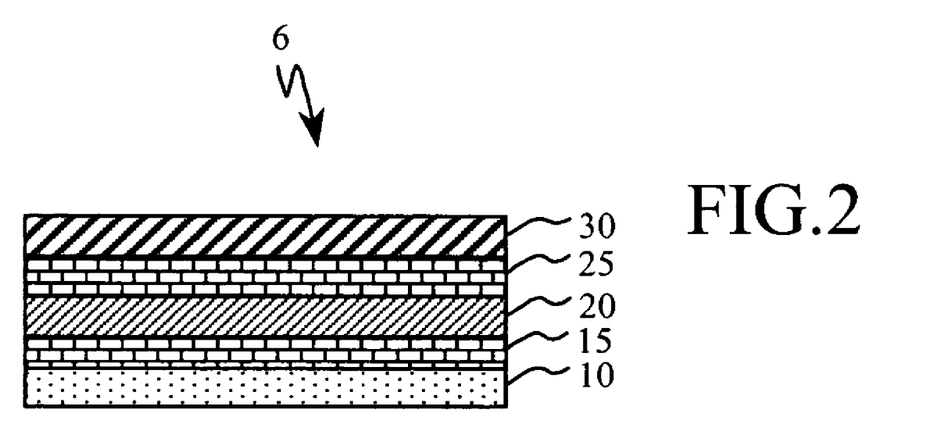
FIG. 2 is a cross-sectional view of a multi-layer compensator having 4 layers.

FIG. 2 shows a cross-sectional schematic of another multilayer compensator 6. The compensator includes a polymeric first layer 10, a contiguous layer 15 that also serves as a barrier layer, a polymeric second layer 20, another contiguous first layer 25 that also serves as a barrier layer, and another polymeric second layer 30, wherein barrier layer 15 is contiguous to layers 10 and 20 and barrier layer 25 is contiguous to layers 20 and 30, and the combined in-plane retardation ($R_{in}$) of the layers 10, 15, 20, 25 and 30 is from 0 to 300 nm and the out-of-plane retardation ($R_{th}$) of the multilayer compensator 6 is more negative than −20 nm or more positive than +20 nm. The composition of layers 10 and 30 may or may not be the same. Also, the composition of barrier layers 15 and 25 may or may not be the same.

Figure 3:
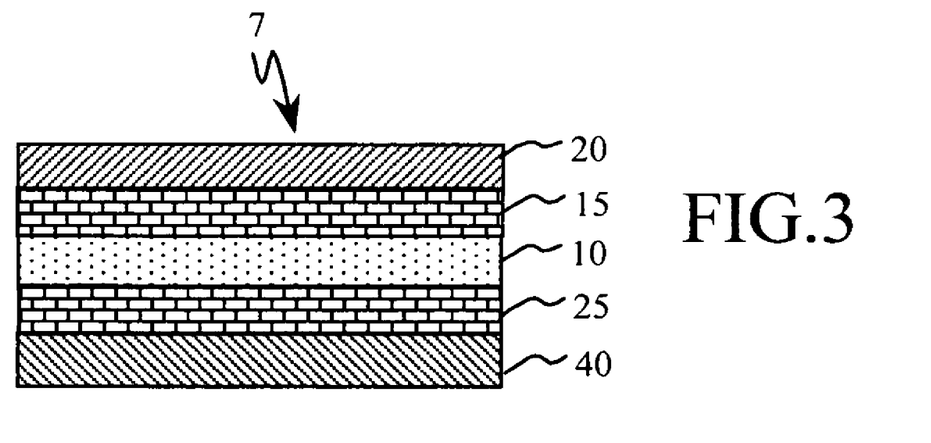
FIG. 3 is a cross-sectional view of a multi-layer compensator having 5 layers.

FIG. 3 shows a cross-sectional schematic of another multilayer compensator 7. The compensator includes a polymeric first layer 10, a contiguous first layer 15 that also serves as a barrier layer, a polymeric second layer 20, another contiguous first layer 25 that also serves as a barrier layer, and another polymeric second layer 40, wherein barrier layer 15 is contiguous to layers 10 and 20 and barrier layer 25 is contiguous to layers 10 and 40, and the combined in-plane retardation ($R_{in}$) of the layers 10, 15, 20, 25 and 40 is from 0 to 300 nm and the combined out-of-plane retardation ($R_{th}$) of the multilayer compensator 7 is more negative than −20 nm or more positive than +20 nm. The composition of layers 20 and 40 may or may not be the same. Also, the composition of barrier layers 15 and 25 may or may not be the same. Conveniently, layers 20 and 40 have the same composition and thickness in order to provide a symmetrical multilayer compensator. One skilled in the art could conceive of more complex structures.

Figure 4A:
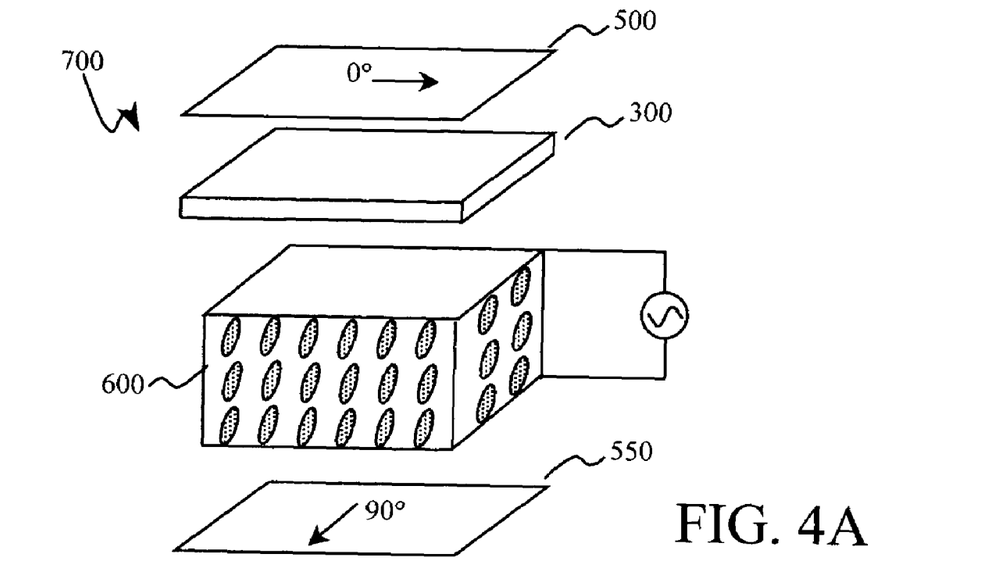
FIG. 4a is an exploded view of a liquid crystal display with one compensating film.

FIG. 4A shows a schematic liquid crystal display 700 where 300 is a single compensating film is placed on one side of the liquid crystal cell 600. 500 is a polarizer, and 550 is a second polarizer. The transmission axes for the polarizers 500 and 550 form a 90°±10° angle relative to each other. The angles of their transmission axes are denoted as 0° and 90° relative to the liquid crystal cell 600. However, other angles are possible depending on the kind of liquid crystal display 700 and this is obvious to those who skilled in the art. Note that 600 is the electrically switchable liquid crystal cell with the liquid crystals confined between two glass plates.

Figure 4B:
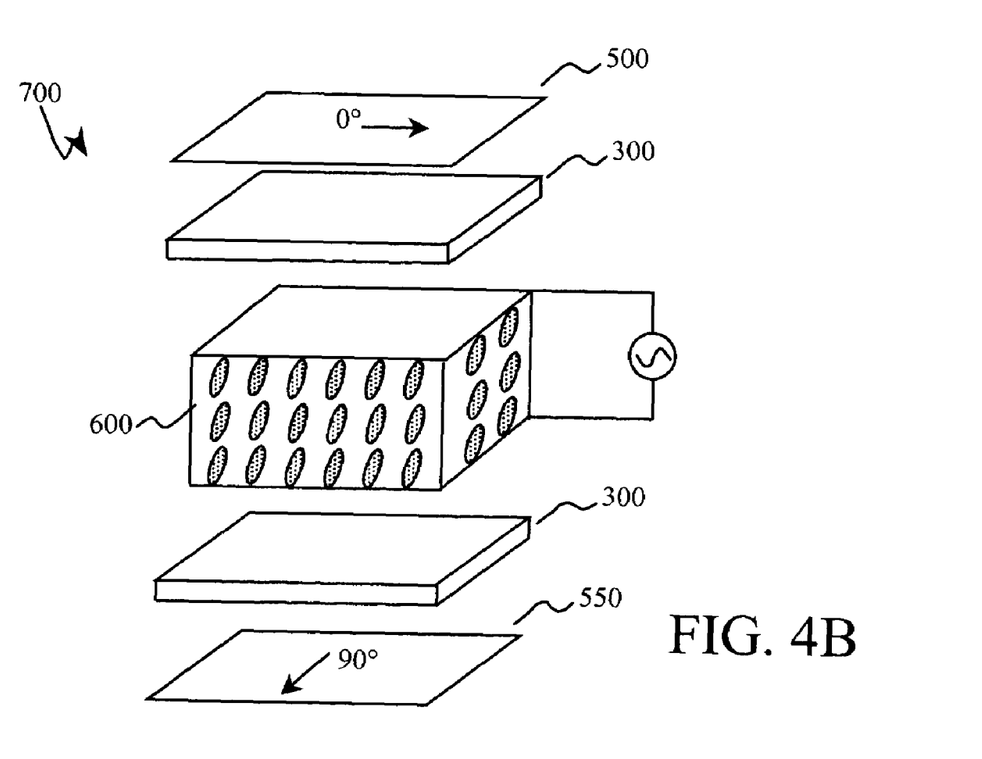
FIG. 4b is an exploded view of a liquid crystal display with two compensating films.

FIG. 4B shows another schematic liquid crystal display 700 where there are two compensating films 300 placed on both sides of the liquid crystal cell (600). 500 is a polarizer and 550 is a second polarizer. The transmission axes for the polarizers 500 and 550 form a 90°±0° angle relative to each other. The angles of their transmission axes are denoted as 0° and 90° relative to the liquid crystal cell 600. However, other angles are possible depending on the kind of liquid crystal display 700 and this is obvious to those who skilled in the art. Note that 600 is the electrically switchable liquid crystal cell with the liquid crystals confined between two glass plates.

Compared to the prior art, embodiments disclosed herein do not require the use of expensive liquid crystal molecules, do not require film lamination (thus reducing the chance introduction of dirt or unwanted optical retardation from the laminating adhesive), provide enhanced optical compensation in a relatively thin (<115 um) structure, and are easily manufactured. As a further attribute, embodiments enable the control of $R_{in}$ which is primarily the responsibility of the first layer while control of $R_{th}$ is primarily the responsibility of the second layer. In the prior art, $R_{in}$ and $R_{th}$ are often coupled and are not controlled independently. Embodiments disclosed herein also provide a compensator having excellent adhesion between layers and that is substantially free of organic solvent-induced curl.

The present invention is further illustrated by the following non-limiting examples of its practice.

In the experiments as explained in more detail below, 80 µm of tri acetyl cellulose (TAC) (typically 2.86 acetyl substitution, 220,000 M.W. polymer) was produced via a solvent casting process with appropriate addenda. One or more layers of water soluble or water dispersible polymeric materials were coated, from an aqueous mixture, onto a TAC film. In each case, these materials comprised one or more of the materials listed in Table A below (the source of each material is listed in parentheses). B-7 polymer was prepared by the following procedure. 19 kg of deionized water was added to a glass-lined reactor, and 18 kg of deionized water was added to a glass-lined head tank. 932 g of RHODACAL® A246L (Rhodia) was rinsed into the reactor with 1 kg of deionized water, and the reactor temperature was set to 60° C. To the head tank 15.9 kg of glycidyl methacrylate, 2.8 kg of butyl acrylate, and 932 g of RHODACAL® A246L was rinsed in with 1 kg of deionized water. To the monomer emulsion 187 g of azobis(4-cyano)valeric acid (75%) was added to the reactor. Within two minutes the monomer emulsion addition, into the reactor, was started (310 mL/minute). When the monomer addition was complete the head tank was rinsed with 2 kg of deionized water. The reactor contents were stirred for two hours at 60° C. 226 g of (35%) hydrogen peroxide was added to a dropping funnel. To the reactor, 80 g of erythobic acid was added, which was dissolved in 1 kg of deionized water. Within two minutes the hydrogen peroxide addition from the dropping funnel began, when the addition was complete the flask was rinsed with 1 kg of deionized water. The glycidyl methacrylate butyl acrylate (85:15) copolymer latex was cooled to 25° C., the yield was 68 kg at 30% solids.

TABLE A

| | |
|---|---|
| B-1 | SANCURE ® 898 (Noveon) |
| B-2 | EASTEK ® 1100 Alcohol-Free (Eastman) |
| B-3 | AQ ® 29D (Eastman) |
| B-4 | NEOREZ ® R-966 (DSM) |
| B-5 | WITCOBOND ® 240 (Crompton) |
| B-6 | WITCOBOND ® 242 (Crompton) |
| B-7 | Glycidyl methacrylate n-butyl acrylate copolymer |
| B-8 | ELVANOL ® 52-22 (Dupont) |
| B-9 | CELVOL ® 103 (Celanese) |
| B-10 | CELVOL ® 107 (Celanese) |
| B-11 | CELVOL ® 205 (Celanese) |
| B-12 | CELVOL ® 603 (Celanese) |

Examples of single layer coatings are listed in Table B. Compositions also include mixtures of water dispersible polymeric materials.

TABLE B

| Example | Barrier Layer Composition | Ratio of components | Barrier Layer Thickness (µm) |
|---|---|---|---|
| 1 | B-1 + B-2 | 1:1 | 0.1 |
| 2 | B-1 + B-2 | 1:1 | 0.8 |
| 3 | B-1 + B-2 | 1:1 | 2.2 |
| 4 | B-1 + B-2 | 1:1 | 3.2 |
| 5 | B-1 + B-2 | 1:1 | 4.2 |
| 6 | B-1 + B-2 | 1:0.43 | 3.6 |
| 7 | B-4 + B-2 | 1:0.43 | 3.9 |

TABLE B-continued

| Example | Barrier Layer Composition | Ratio of components | Barrier Layer Thickness (µm) |
|---|---|---|---|
| 8 | B-8 | — | 0.6 |
| 9 | B-9 | — | 0.7 |
| 10 | B-12 + B-2 | 1:0.43 | 1.0 |
| 11 | B-11 + B-2 | 1:0.43 | 1.0 |

Multi-layer layer coatings of water soluble or water dispersible barrier materials, coated simultaneously, are listed in Table C. Layer X corresponds to the bottom-most layer, layer Y the middle layer, and layer Z the topmost layer, as coated onto a TAC support. The total multi-layer thickness corresponds to a combined total of all three layers.

TABLE C

| Example | Barrier Layer X | Barrier Layer Y | Ratio of Layer Y components | Barrier Layer Z | Total Multi-layer thickness (µm) |
|---|---|---|---|---|---|
| 12 | B-3 | B-1 + B-2 | 1:1 | B-3 | 4.1 |
| 13 | B-3 | B-1 + B-2 | 1:1 | B-7 | 4.6 |
| 14 | B-3 | B-1 + B-2 | 1:1 | B-5 | 4.2 |
| 15 | B-3 | B-1 + B-2 | 1:1 | B-6 | 5.0 |
| 16 | B-3 | B-9 | — | B-6 | 1.9 |
| 17 | B-3 | B-9 | — | B-5 | 2.3 |
| 18 | B-3 | B-9 | — | B-7 | 1.8 |

Various known cross-linking additives were mixed with single barrier layer compositions prior to coating, described in Table D. The weight % is the amount of additive based on the total polymer concentration in the coating mixture. CX-100 is a polyaziridine, Cymel 373 is a partially methylated melamine resin.

TABLE D

| Example | Barrier Layer Composition | wt ratio of components | wt % of cross-linker | Barrier Layer(s) Thickness (µm) |
|---|---|---|---|---|
| 19 | B-1 + B-2 | 1:0.43 | 0.4 CX-100 (DSM) | 3.4 |
| 20 | B-4 + B-2 | 1:0.43 | 0.4 CX-100 (DSM) | 3.4 |
| 21 | B-8 | — | 0.5 Cymel 373 (Cytec) | 0.5 |

After drying, a birefringent amorphous polyester polymer layer was further coated on the films of Examples 1–21, using conventional coating methods. The polymer (poly(4,4'-hexafluoroisopropylidene-bisphenol-co-4,4'-(2-norbornylidene)bisphenol)terephthalate-co-isophthalate) was dissolved in a mixture of 90% ethylacetate and 10% propylacetate, coated, and dried. The residual solvent (ethylacetate and propylacetate) remaining in the film was measured 1–2 after coating by gas chromatogram (Table E). Example 1 is of the thinnest barrier coating, which resulted in an elevated level of retained solvent in the film.

TABLE E

| Example | Second Layer Thickness (μm) | Ethylacetate (mg/ft$^2$) | Propylacetate (mg/ft$^2$) |
|---|---|---|---|
| 1 | 5.0 | 72 | 104 |
| 2 | 4.4 | 18 | 63 |
| 3 | 4.5 | 11 | 54 |
| 4 | 4.5 | 12 | 54 |
| 5 | 4.4 | 5 | 34 |
| 6 | 3.1 | 8 | 17 |
| 7 | 3.6 | 39 | 60 |
| 8 | 3.3 | 1 | 19 |
| 9 | 3.2 | 2 | 19 |
| 10 | 3.2 | 3 | 13 |
| 11 | 3.2 | 4 | 15 |
| 12 | 3.4 | 4 | <1 |
| 13 | 3.5 | 4 | <1 |
| 14 | 3.7 | 7 | <1 |
| 15 | 4.0 | <1 | <1 |
| 16 | 3.4 | 4 | <1 |
| 17 | 3.4 | 4 | <1 |
| 18 | 3.5 | 5 | <1 |
| 19 | 3.3 | 3 | 22 |
| 20 | 3.6 | 41 | 64 |
| 21 | 3.2 | 4 | 14 |

The composite films were then stretched uniaxially on a film stretcher using a uniaxial constrained mode. In this mode the film was held in both directions, heated to a temperature and stretched in one of the held directions to a desired stretch ratio. The composite film was then cooled to room temperature before the tension was removed. The in-plane ($R_{in}$) and out-of-plane ($R_{th}$) retardations were measured, at a wavelength of 590 nm, using the M-2000V Spectroscopic Ellipsometer (J. A. WOOLLAM CO.®). The haze was measured using a Haze-gard Plus (BYK GARDNER®) according to ASTM D-1003 and ASTM D10044 standards. The conditions used to prepare the exemplary composite films, the multilayer compensator in-plane ($R_{in}$), out-of-plane ($R_{th}$) retardation values, corresponding second layer birefringence, and haze are listed in Table F below.

TABLE F

| Example | Stretch Temperature (° C.) | Stretch Ratio | Birefringence of Second Layer | Rin | Rth | Haze after stretching (%) |
|---|---|---|---|---|---|---|
| 1 | 141 | 1.15 | −0.021 | 47 | −158 | 2.0 |
| 2 | 141 | 1.15 | −0.028 | 53 | −176 | 1.2 |
| 3 | 141 | 1.15 | −0.027 | 52 | −173 | 1.0 |
| 4 | 141 | 1.15 | −0.027 | 54 | −175 | 1.0 |
| 5 | 141 | 1.15 | −0.029 | 53 | −182 | 0.9 |
| 6 | 140 | 1.2 | −0.036 | 52 | −164 | 0.9 |
| 7 | 142 | 1.2 | −0.025 | 49 | −142 | 1.1 |
| 8 | 140 | 1.2 | −0.039 | 60 | −181 | 1.0 |
| 9 | 140 | 1.2 | −0.043 | 63 | −190 | 1.1 |
| 10 | 142 | 1.2 | −0.031 | 49 | −152 | 1.2 |
| 11 | 140 | 1.2 | −0.030 | 48 | −150 | 2.0 |
| 12 | 145 | 1.2 | −0.063 | 37 | −218 | 1.1 |
| 13 | 145 | 1.2 | −0.060 | 34 | −214 | 1.3 |
| 14 | 145 | 1.2 | −0.056 | 29 | −211 | 1.0 |
| 15 | 145 | 1.2 | −0.049 | 29 | −205 | 1.1 |
| 16 | 145 | 1.2 | −0.055 | 29 | −194 | 1.4 |
| 17 | 145 | 1.2 | −0.062 | 29 | −217 | 1.2 |
| 18 | 145 | 1.2 | −0.065 | 36 | −233 | 2.3 |
| 19 | 140 | 1.2 | −0.037 | 59 | −178 | 0.7 |
| 20 | 140 | 1.2 | −0.027 | 50 | −148 | 0.9 |
| 21 | 140 | 1.2 | −0.031 | 47 | −152 | 1.7 |

The out of plane retardation ($R_{th}$) contribution from an 80 μm TAC sheet varies from approximately −80 nm to a value of about −40 nm. The TAC $R_{th}$ can be manipulated by changes in the TAC casting process and the multilayered compensator stretching process.

In similarity to previous examples 1–21, a single layer barrier was coated onto 80 μm thickness TAC support and dried. After drying, a birefringent second layer was further coated on the above-coated film using an amorphous polymer comprising a polycarbonate (PC). The PC polymers were dissolved in methylene chloride. Specific layer thicknesses and compositions are shown in Table G. A coating of PC without a barrier layer is included for comparison. Examples with a barrier layer result in significantly lower residual methylene chloride in the coating (as measured by gas chromatograph).

TABLE G

| Example | Barrier Layer Composition | Barrier Layer Thickness (μm) | Birefringent Layer Thickness (μm) | Birefringent Layer | Residual Methylene chloride (mg/ft$^2$) |
|---|---|---|---|---|---|
| Comparison | None | 0 | 7.3 | LEXAN ® 131-112(GE) | 1018 |
| 22 | B-9 | 1.0 | 6.1 | LEXAN ® 141-112(GE) | 121 |
| 23 | B-10 | 1.0 | 6.2 | LEXAN ® 141-112 | 135 |
| 24 | B-9 | 1.8 | 6.1 | LEXAN ® 131-112 | 145 |

The composite films were then stretched uniaxially on a film stretcher using a uniaxial constrained mode and retardation measurements performed similar to Examples 1–21.

TABLE H

| Example | Stretch Temperature (° C.) | Stretch Ratio | Birefringence of the Second Layer | Rin | Rth | Haze after stretching (%) |
|---|---|---|---|---|---|---|
| Comparison | 155 | 1.3 | −0.001 | 29 | −62 | 1.0 |
| 22 | 155 | 1.3 | −0.006 | 32 | −92 | 1.1 |
| 23 | 155 | 1.3 | −0.006 | 33 | −91 | 1.4 |
| 24 | 155 | 1.3 | −0.009 | 46 | −108 | 1.3 |

Multilayer compensators including at least two polymeric first layers (including a barrier layer), and one or more polymeric second layers, as disclosed herein may be fabricated under several scenarios.

According to a first scenario, one first layer (e.g., a TAC layer) is unwound, and another first layer (e.g., a barrier layer) is coated thereon. The resultant film is then stretched before one or more second layers is/are coated thereon.

According to a second scenario, one first layer (e.g., a TAC layer) is unwound, and another first layer (e.g., a barrier layer) is coated thereon. One or more second layers is/are coated on the combined first layers, and the resultant product including the two first layers and the one or more second layers is stretched.

In these scenarios, the temperature Ts at which stretching is performed beneficially satisfies one of the following relationships: (1) Ts is greater than or equal to the Tg of both first layers and the second layer(s); (2) Ts is greater than the Tg of both first layers and the second layer(s); (3) Ts is greater than the Tg of both first layers, but less than the Tg of the second layer(s); or (4) Ts is greater than the Tg of both first layers, but much less than the Tg of the second layer(s). Other arrangements are possible.

The invention has been described in detail with particular reference to certain preferred embodiments thereof, but it will be understood that variations and modifications can be affected within the scope of the invention.

PARTS LIST 5 compensator according to one embodiment of the present invention
6 compensator according to one embodiment of the present invention
7 compensator according to one embodiment of the present invention
10 polymeric first layer
15 contiguous first layer that serves as a barrier
20 polymeric second layer
25 contiguous first layer that serves as a barrier
30 polymeric second layer
40 polymeric second layer
300 compensator according to one embodiment of the present invention
500 polarizer
550 polarizer
600 liquid crystal cell
700 liquid crystal display

The invention claimed is:

1. A multilayer compensator comprising:
at least two polymeric first layers; and
one or more polymeric second layers,
wherein the first layers comprise a polymer having an out-of-plane birefringence not more negative than −0.005 and not more positive than +0.005;
wherein the second layers comprise a polymer having an out-of-plane birefringence more negative than −0.005 or more positive than +0.005;
wherein the overall magnitude of the in-plane retardation ($R_{in}$) of the multilayer compensator is greater than 0 nm and less than 300 nm and the out-of-plane retardation ($R_{th}$) of the multilayer compensator is more negative than −20 nm or more positive than +20 nm,
wherein one of the first layers is contiguous to a second layer and is between all of the other first layers and all of the second layers,
wherein at least one of the second layers is a layer coated from an organic solvent,
wherein the contiguous first layer includes a polymer that is water soluble or water dispersible in an amount sufficient to limit an amount of the organic solvent that diffuses into the first layers to be less than 75 mg/ft$^2$ when the organic solvent is ethylacetate, less than 105 mg/ft$^2$ when the organic solvent is propylacetate, and less than 150 mg/ft$^2$ when the organic solvent is methylene chloride, and
wherein the compensator has been stretched in at least one direction by at least 1% and not more than 60% after at least two of the first layers were assembled together.

2. The multilayer compensator of claim 1, wherein the compensator has been stretched at least 10% and not more than 60%.

3. The multilayer compensator of claim 1, wherein the compensator has been stretched at least 12% and not more than 60%.

4. The multilayer compensator of claim 1, wherein the compensator has been stretched at least 20% and not more than 60%.

5. The multilayer compensator of claim 1, wherein at least two of the layers are contiguous layers.

6. The multilayer compensator of claim 1, wherein all of said first and said second layers are contiguous.

7. The multilayer compensator of claim 1, wherein the second layers have a combined thickness of less than 30 micrometers.

8. The multilayer compensator of claim 1, wherein the second layers have a combined thickness of from 1.0 to 10 micrometers.

9. The multilayer compensator of claim 1, wherein the second layers have a combined thickness of from 2 to 8 micrometers.

10. The multilayer compensator of claim 1, wherein the overall in-plane retardation ($R_{in}$) of said multilayer compensator is between 21 and 200 nm.

11. The multilayer compensator of claim 1, wherein the overall in-plane retardation ($R_{in}$) of said multilayer compensator is between 25 and 150 nm.

12. The multilayer compensator of claim 1, wherein the overall in-plane retardation ($R_{in}$) of said multilayer compensator is between 25 and 100 nm.

13. The multilayer compensator of claim 1, wherein the combined thickness of the first and second layers is less than 180 μm.

14. The multilayer compensator of claim 1, wherein the combined thickness of the first and second layers is from 41 to 105 μm.

15. The multilayer compensator of claim 1, wherein the combined thickness of the first and second layers is from 41 to 90 μm.

16. The multilayer compensator of claim 1, wherein the polymer of the one or more second layers is an amorphous polymer.

17. The multilayer compensator of claim 1, wherein the contiguous first layer includes a polymer that is water soluble or water dispersible in an amount sufficient to limit an amount of the organic solvent that diffuses into the first layers to be less than 45 mg/ft$^2$ when the organic solvent is ethylacetate, and less than 65 mg/ft$^2$ when the organic solvent is propylacetate.

18. The multilayer compensator of claim 1, wherein the out-of-plane retardation ($R_{th}$) of the multilayer compensator is more negative than −20 nm.

19. The multilayer compensator of claim 18, wherein the polymer of the one or more second layers contains in the backbone a non-visible chromophore group and has a glass transition temperature (Tg) greater than 110° C.

20. The multilayer compensator of claim 19, wherein the polymer of the one or more second layers comprises pendant cycloaliphatic groups.

21. The multilayer compensator of claim 20, wherein the cycloaliphatic groups are at least one selected from the group of cyclopentane, cyclohexane, norbornene, hexahydro-4,7-methanoindan-5-ylidene, adamantane, and any of the forgoing having fluorine substitution for at least one hydrogen atom.

22. The multilayer compensator of claim 18, wherein the polymer of the one or more second layers contains in the backbone a nonvisible chromophore containing a vinyl, carbonyl, amide, imide, ester, carbonate, aromatic, sulfone, or azo, phenyl, naphthyl, biphenyl, bisphenol, or thiophene group.

23. The multilayer compensator of claim 18, wherein the polymer of the one or more second layers comprises a copolymer containing (1) a poly(4,4'-hexafluoroisopropylidene-bisphenol) terephthalate-co-isophthalate, (2) a poly(4,4'-hexahydro-4,7-methanoindan-5-ylidene bisphenol) terephthalate, (3) a poly(4,4'-isopropylidene-2,2'6,6'-tetrachlorobisphenol) terephthalate-co-isophthalate, (4) a poly(4,4'-hexafluoroisopropylidene)-bisphenol-co-(2-norbornylidene)-bisphenol terephthalate, (5) a poly(4,4'-hexahydro-4,7-methanoindan-5-ylidene)-bisphenol-co-(4,4'-isopropylidene-2,2',6,6'-tetrabromo)-bisphenol terephthalate, (6) a poly(4,4'-isopropylidene-bisphenol-co-4,4'-(2-norbornylidene)bisphenol) terephthalate-co-isophthalate, (7) a poly(4,4'-hexafluoroisopropylidene-bisphenol-co-4,4'-(2-norbornylidene)bisphenol) terephthalate-co-isophthalate, or (8) copolymers of any two or more of the foregoing.

24. The multilayer compensator of claim 18, wherein the polymer of the at least two first layers comprises a cellulosic, acrylic, cyclic polyolefin, or polyarylate containing flourene groups.

25. The multilayer compensator of claim 1 wherein the out-of-plane retardation ($R_{th}$) of the multilayer compensator is more positive than +20 nm.

26. The multilayer compensator of claim 25, the polymer of the one or more second layers contains off the backbone a vinyl, carbonyl, amide, imide, ester, carbonate, aromatic, sulfone, or azo group.

27. The multilayer compensator of claim 25, wherein the polymer of the one or more second layers contains off the backbone a non-visible chromophore group and has a glass transition temperature (Tg) greater than 110° C.

28. The multilayer compensator of claim 27, wherein the non-visible chromophore group includes a carbonyl, amide, imide, ester, carbonate, phenyl, naphthyl, biphenyl, bisphenol, or thiophene group.

29. The multilayer compensator of claim 27, wherein the non-visible chromophore group includes a heterocyclic or carbocyclic aromatic group.

30. The multilayer compensator of claim 25, wherein the polymer of the one or more second layers is selected from the group consisting of (A) poly(4 vinylphenol), (B) poly(4 vinylbiphenyl), (C) poly(N-vinylcarbazole), (D) poly(methylcarboxyphenylmethacrylamide), (E) poly[(1-acetylindazol-3-ylcarbonyloxy)ethylene], (F) poly(phthalimidoethylene), (G) poly(4-(1-hydroxy-1-methylpropyl)styrene), (H) poly(2-hydroxymethylstyrene), (I) poly(2-dimethylaminocarbonylstyrene), (J) poly(2-phenylaminocarbonylstyrene), (K) poly(3-(4-biphenylyl)styrene), (L) poly(4-(4-biphenylyl)styrene), (M) poly(4-cyanophenyl methacrylate), (N) poly(2,6-dichlorostyrene), (O) poly(perfluorostyrene), (P) poly(2,4-diisopropylstyrene), (O) poly(2,5-diisopropylstyrene), (R) poly(2,4,6-trimethylstyrene), and (S) copolymers of any two or more of the foregoing.

31. The multilayer compensator of claim 25, wherein the polymer of the at least two first layers comprises a cellulosic, acrylic, cyclic polyolefin, or polyarylate containing flourene groups.

32. The multilayer compensator of claim 31, wherein the polymer of the at least two first layers comprises triacetylcellulose, cellulose diacetate, cellulose acetate butyrate, polycarbonate, cyclic polyolefin, polystyrene or polyarylate containing fluorene groups.

33. A liquid crystal display comprising a liquid crystal cell, a pair of crossed polarizers located one on each side of the cell, and at least one compensator of claim 1.

34. The liquid crystal display of claim 33, wherein said liquid crystal cell is a vertically aligned cell, a twisted nematic cell, an in-plane switching mode cell, or an optically compensated bend liquid crystal cell.

35. A liquid crystal display comprising a liquid crystal cell, at least one polarizer, a reflective plate, and at least one compensator of claim 1.

36. The multiplayer compensator of claim 1 wherein the compensator has been stretched in at least one direction by at least 1% and not more than 60% after at least two of the first layers, including the contiguous layer, were assembled together.

* * * * *